United States Patent [19]

Langenfeld et al.

[11] Patent Number: 4,930,974
[45] Date of Patent: Jun. 5, 1990

[54] EXTENDER FOR A TRACTOR LOADER

[75] Inventors: Joseph W. Langenfeld; Neal W. Westendorf, both of Onawa, Iowa

[73] Assignee: Westendorf Mfg. Co., Inc., Onawa, Iowa

[21] Appl. No.: 911,506

[22] Filed: Sep. 25, 1986

[51] Int. Cl.⁵ .................................................. B66C 1/22
[52] U.S. Cl. ...................................... 414/631; 414/723
[58] Field of Search ............... 414/24.6, 619, 630–635, 414/639–642, 697, 721, 723, 709

[56] References Cited

U.S. PATENT DOCUMENTS

| | | | |
|---|---|---|---|
| 3,054,520 | 9/1962 | Maloney | 414/697 X |
| 3,826,392 | 7/1974 | Farley | 414/630 |
| 3,845,871 | 11/1974 | Dilillo et al. | 414/723 |
| 4,040,534 | 8/1977 | Kenworthy | 414/641 X |
| 4,084,715 | 4/1978 | Stedman | 414/641 X |
| 4,085,856 | 4/1978 | Westendorf | 414/723 |
| 4,120,405 | 10/1978 | Jones et al. | 414/721 X |
| 4,257,725 | 3/1981 | Zieschang | 414/723 X |
| 4,394,107 | 7/1983 | Siebert | 414/631 |
| 4,488,850 | 12/1984 | Wernimont | 414/723 |
| 4,586,867 | 5/1986 | Stafford | 414/723 |

FOREIGN PATENT DOCUMENTS

| | | | |
|---|---|---|---|
| 99672 | 8/1964 | Denmark | 414/631 |
| 466 | 1/1983 | Japan | 414/642 |
| 76377 | 5/1983 | Japan | 414/642 |

*Primary Examiner*—David A. Bucci
*Assistant Examiner*—William M. Hienz
*Attorney, Agent, or Firm*—Zarley, Mckee, Thomte, Voorhees & Sease

[57] ABSTRACT

An extender is positioned on the forward ends of the boom arms of a tractor loader. The extender includes a frame which is pivotally mounted on the forward ends of the boom arms and a slide which is vertically movably mounted on the extender frame. A cable is connected at one end thereof to the slide and extends therefrom over a pulley arrangement which causes the slide to be vertically moved relative to the extender frame as the boom arms are vertically moved relative to the tractor.

5 Claims, 5 Drawing Sheets

EXTENDER FOR A TRACTOR LOADER

BACKGROUND OF THE INVENTION

Tractor loaders or front-end loaders such as described in U.S. Pat. No. 4,051,962 includes a frame means which is mounted on the tractor and which has a pair of boom arms pivotally mounted thereon. Some form of materials handling attachment such as a hay spike, bucket, etc. is normally mounted on the forward ends of the boom arms. The vertical height to which the attachment may be raised is limited by the length of the boom arms and the hydraulic cylinders connected thereto which raise and lower the boom arms. The height limitation of the conventional front loaders sometimes prevents a loader from being used to stack hay bales or the like.

It is therefore a principal object of the invention to provide an improved tractor loader.

A further object of the invention is to provide a front end loader for a tractor including an extender means thereon which enables the materials handling attachment to be raised above the position normally possible by the conventional front-end loader.

A further object of the invention is to provide a tractor loader including an extender on the forward end thereof which is automatically raised as the loader boom arms are raised relative to the tractor.

A further object of the invention is to provide an improved tractor loader which is economical of manufacture, durable in use and refined in appearance.

A further object of the invention is to provide an extender for a tractor loader or the like which enables the apparatus to be moved into confined areas since the loader arms do not have to be lengthened to achieve the desired lift height.

Still another object of the invention is to provide an extender for a tractor loader which may be quickly and easily mounted on a conventional tractor loader without modification thereof.

Still another object of the invention is to provide a tractor loader of the type described which enables a tractor loader having relatively short boom arms to raise material such as hay or the like to a greater lift height.

These and other objects will be apparent to those skilled in the art.

SUMMARY OF THE INVENTION

Figure 1:
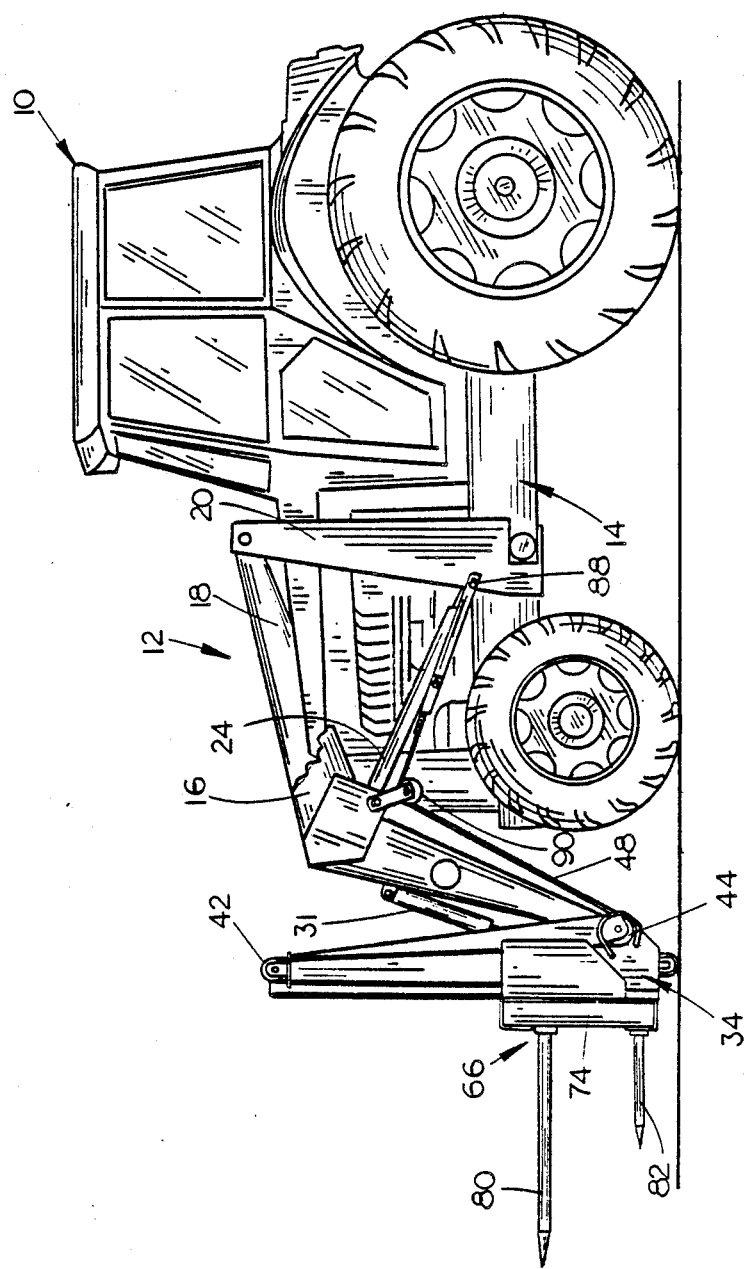
FIG. 1 is a side view of a tractor loader having the extender of this invention mounted thereon.

A tractor loader is described which includes an extender on the forward ends of the boom arms so that the materials handling attachment mounted thereon may be raised to a position above that which is normally possible. An extender frame is mounted on the forward end of the boom arms of the tractor loader and has a slide vertically movably mounted thereon. The materials handling attachment is operatively secured to the slide for vertical movement therewith. A cable is connected to the slide and passes rearwardly therefrom over a pulley arrangement which causes the slide to be vertically moved upwardly relative to the extender frame when the boom arms are raised relative to the tractor.

DESCRIPTION OF THE PREFERRED EMBODIMENT

Referring to the drawings, the numeral 10 refers to a tractor having a conventional front end loader 12 mounted thereon. Although loaders of the type shown are generally mounted on the forward ends of the tractor, loaders are sometimes mounted on the rearward end of the tractor. Further, the loader could be mounted on any wheeled vehicle having a vertically movable boom means. However, the preferred embodiment of the invention contemplates that the loader be mounted on the forward or front end of the tractor.

Loader 12 includes a frame means having a pair of boom arms 16 and 18 which are pivotally mounted at their rearward ends to towers 20 and 22 respectively. A pair of hydraulic cylinders 24 and 26 are provided for raising and lowering the boom arms 16 and 18 relative to frame means 14 and tractor 10.

Preferably, a quick attach means 28 is provided on the forward end of each of the boom arms 16 and 18 to provide a quick and convenient means for securing the extender 30 of this invention. The quick attachment means 28 is preferably of the type such as described in U.S. Pat. No. 4,051,962 and is pivoted by a hydraulic cylinder means 31.

Figure 3:
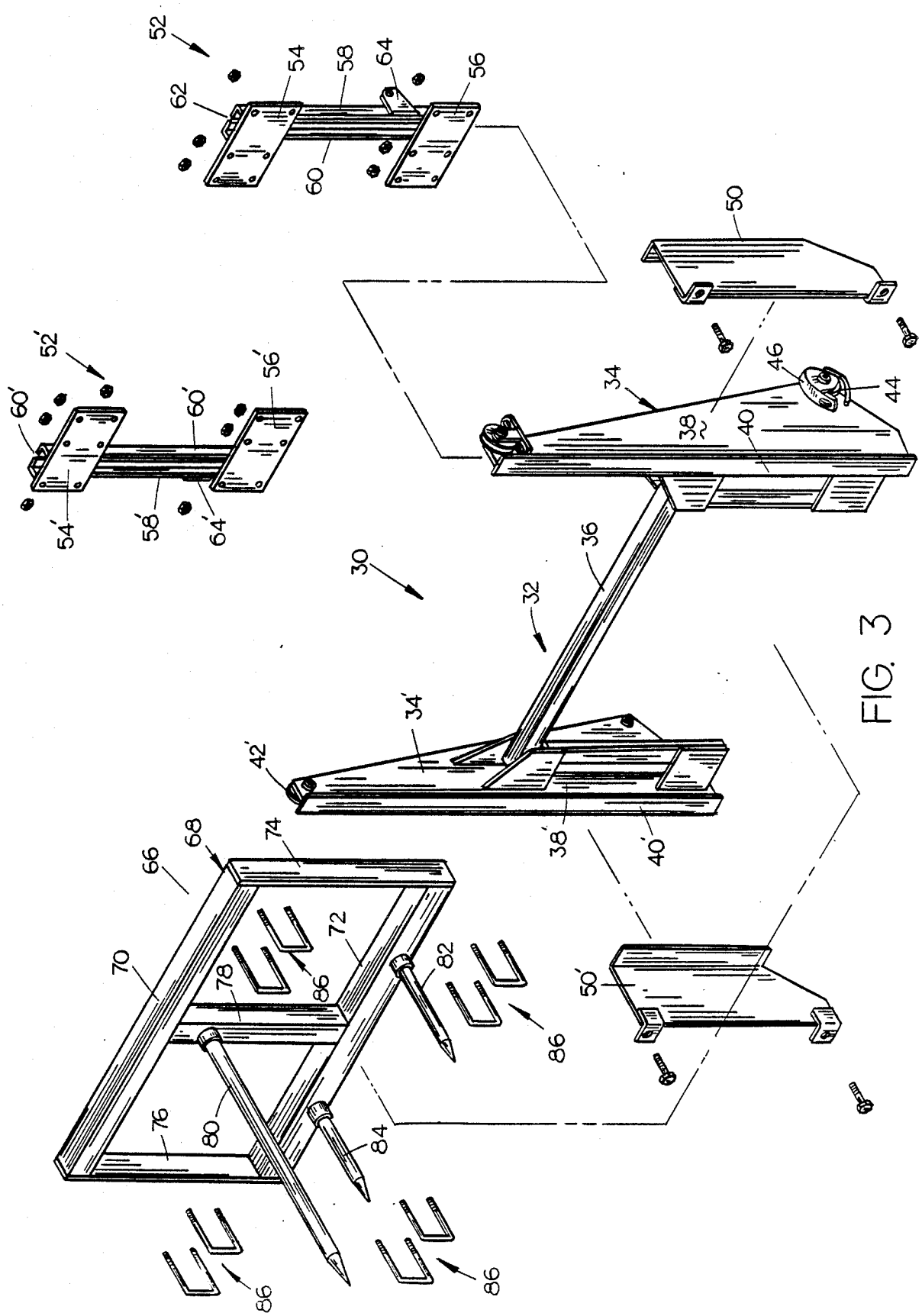
FIG. 3 is an exploded perspective view of the extender of this invention.
Figure 6:
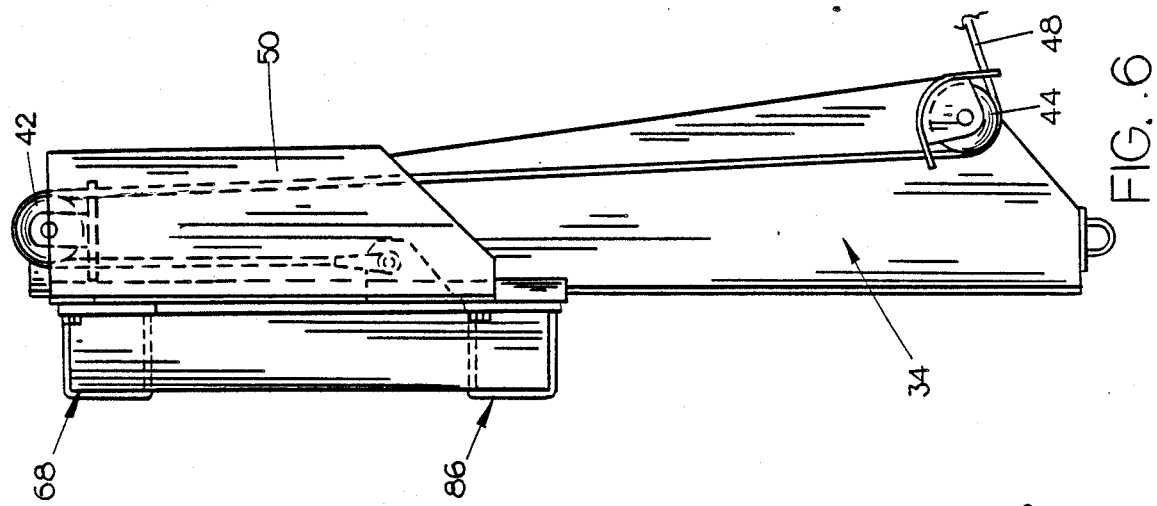
FIG. 6 is a side view similar to FIG. 5 except that the slide has been moved upwardly on the supporting mast.
Figure 5:
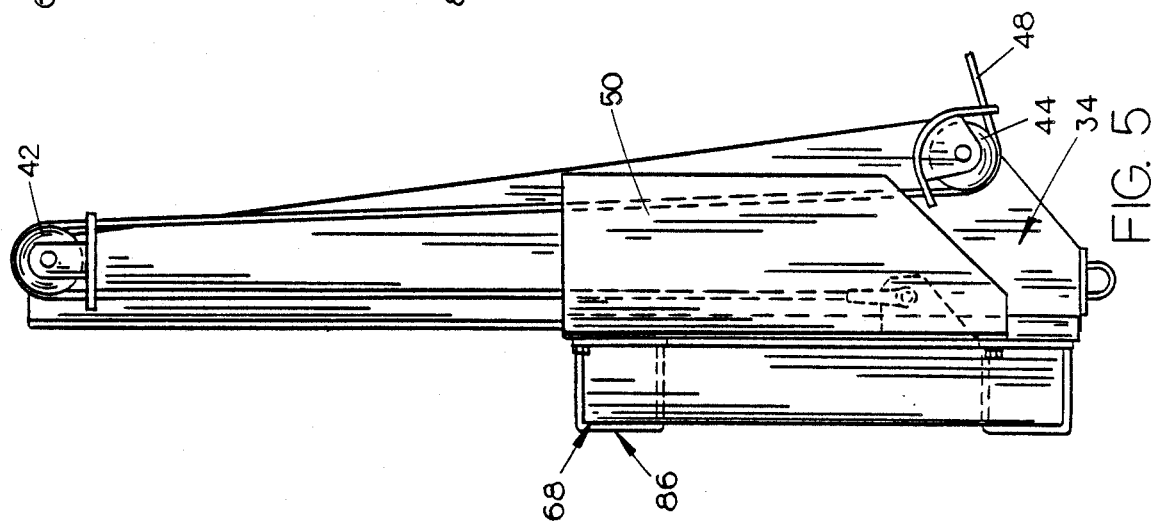
FIG. 5 is a side elevational view of the extender.
Figure 4:
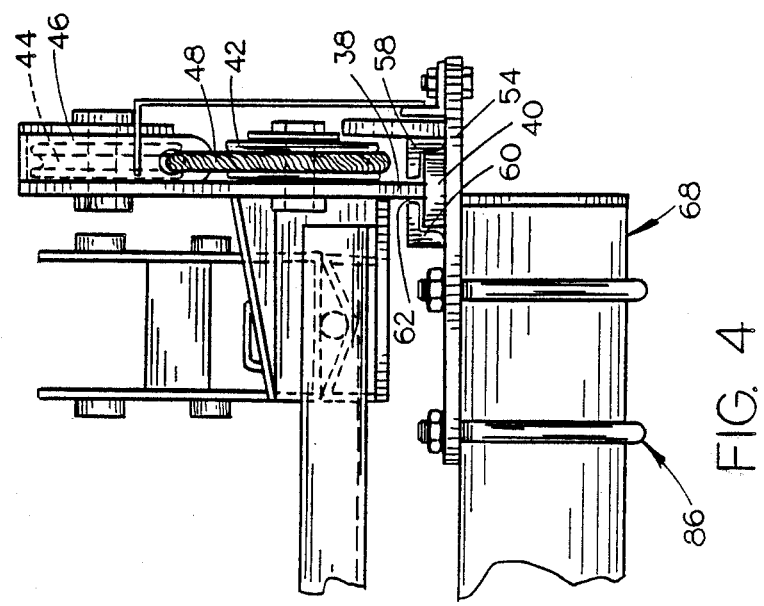
FIG. 4 is a partial top view of the extender.
Figure 7:
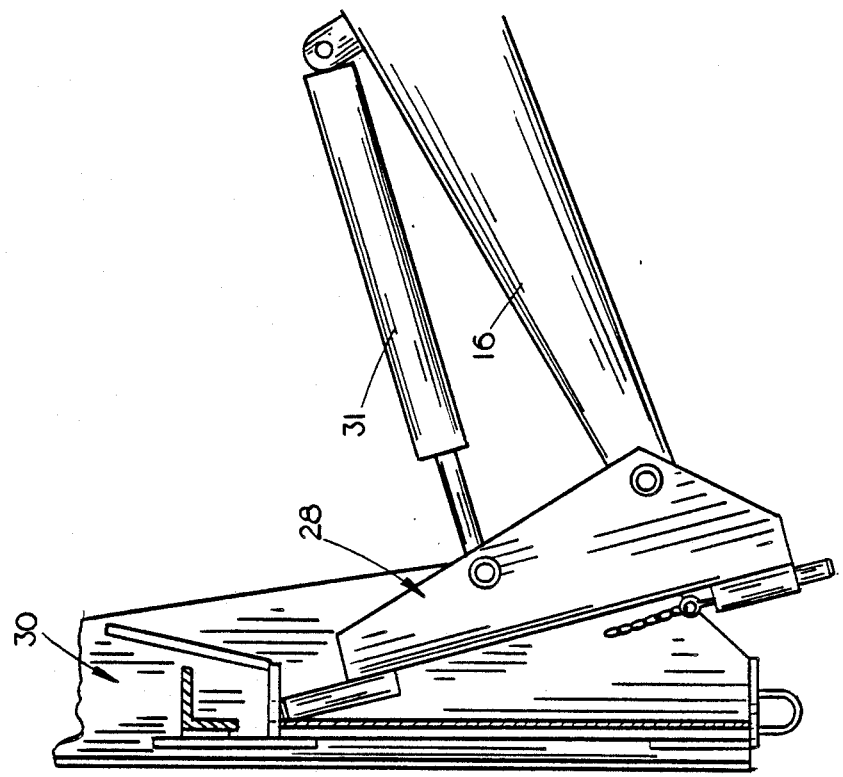
FIGS. 7-9 are sectional views illustrating the manner in which the extender is secured to the quick attach mechanism of the tractor loader.

Extender 30 comprises a frame means 32 including a pair of upstanding frame members or masts 34 and 34' connected by a brace 36. Inasmuch as masts 34 and 34' are identical, only mast 34 will be described in detail with "'" indicating identical structure on mast 34', Mast 34 includes an upstanding plate 38 having a transversely disposed bar 40 secured to the forward end thereof so that plate 38 and bar 40 define a T-shape. A rotatable sheave 42 is mounted on the upper outer side of plate 38 and a rotatable sheave 44 is mounted on the lower outer sides of plate 38 adjacent the rearward end thereof as seen in FIG. 3. A cable guide or retainer 46 is positioned adjacent sheave 44 to maintain the cable 48 thereon as will be described hereinafter. Shield 50 is secured to the outer side of plate 38 as seen in FIG. 3.

Slides 52 and 52' are vertically slidably mounted on masts 34 and 34' respectively. Since slide 52' is identical to slide 52, only slide 52 will be described in detail with "'" denoting identical structure on slide 52'. Slide 52 comprises upper and lower plates 54 and 56 having a pair of vertically disposed, elongated angle members 58 and 60 secured thereto and extending therebetween in a spaced-apart relationship so as to define an opening or slot 62 therebetween. Bracket 64 is secured to angle member 58 as seen in FIG. 3. As seen in the drawings, the slides 52 and 52' are positioned on the masts 34 and 34' so that bars 40 and 40' are received between the channels 58–60 and 58"60' respectively with the plates 38 and 38' being received in slots 62 and 62' respectively.

The numeral 66 refers to a materials handling attachment which may be in the form of a hay bale spike. Attachment 66 includes a frame means 68 comprising upper and lower frame members 70 and 72 and side frame members 74 and 76. Intermediate frame member 78 extends between frame members 70 and 72 and has a bale spike 80 extending therefrom. Bale spikes 82 and 84 extend forwardly from frame member 72 as seen in FIG. 3. Attachment 66 is secured to plates 54, 56, 54' and 56' of slides 52 and 52' by means of U-bolt assemblies generally referred to by the reference numerals 86.

The rearward end of cable 48 is removably secured to tower 20 at 88 which registers with the location at which the cylinder 24 is secured to the tower. Cable 48 extends forwardly from 88 generally parallel to the longitudinal axis of cylinder 24 and passes around a sheave 90 which is removably secured to boom arm 16 at 92. Cable 48 extends forwardly from sheave 90 and passes beneath and around sheave 44. Cable 48 extends upwardly from sheave 44 and around the sheave 42 in the manner illustrated in the drawings. Cable 48 extends downwardly from sheave 42 and is secured to bracket 64 by any convenient means. Cable 50, although not shown, extends between tower 22 and bracket 64' in identical fashion to that described.

Figure 8:
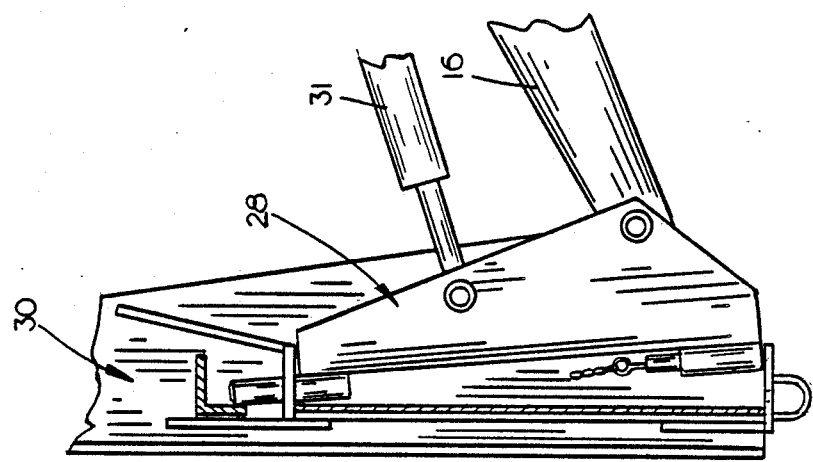
Figure 9:
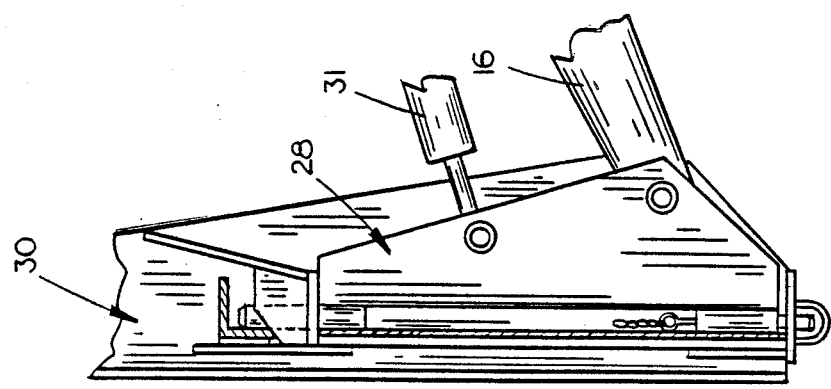

The entire extender 30 may be quickly and easily mounted on the tractor by simply positioning the quick attach means 28, on the arms 16 and 18, to pockets provided on each of the masts 34 and 34' as seen in FIGS. 8-10. The details of the pockets are unimportant and will not be described in detail since the construction thereof will vary with the construction of the particular quick attach means.

Figure 2:
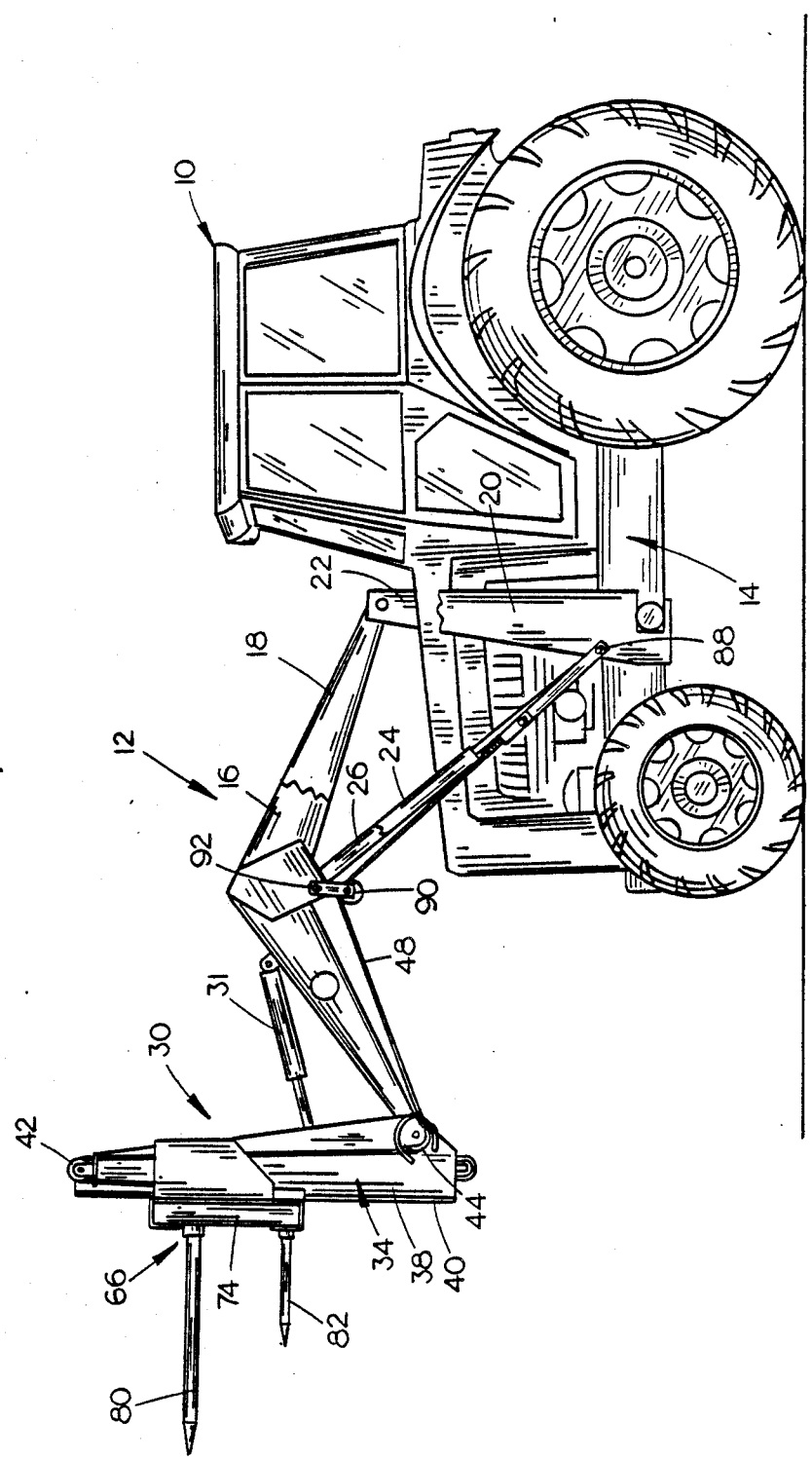
FIG. 2 is a view similar to FIG. 1 except that the loader arms and extender have been raised from the position of FIG. 2.

Once the attachment 28 has been secured to the boom arms 16 and 18 by the quick attach means or otherwise, the rearward end of the cable 48 is passed around sheave 90, which has been secured to arm 16 at 92, and connected to the tower at 88. As seen in FIG. 1, when the loader is in its lowered position, the extender 30 is also in its lowermost position. As the boom arms 16 and 18 are raised by the hydraulic cylinders 24 and 26, cables 48 and 48' cause the slides 52 and 52' to vertically move upwardly on masts 34 and 34' respectively. As can be visualized in FIG. 2, the vertical movement of the extender 30 permits the attachment 66 to be raised to a height greater than if the attachment were directly mounted on the forward ends of boom arms 16 and 18. It should be noted that FIG. 2 does not illustrate the loader 12 in its maximum raised position nor does FIG. 2 illustrate the extender 30 in its maximum vertical position.

It can therefore be seen that the extender of this invention provides an extra lift height for a conventional loader without the requirement of extending the length of the boom arms. The extender of this invention permits the loader to stack hay or the like in confined areas such as barns or the like and to permit the hay to be raised to the upper reaches of a stack or the like. The device of this invention is easy to install on a conventional loader without modification thereof. When the extra lift height is not required, the extender is quickly and easily removed from the loader.

Thus it can be seen that the invention accomplishes at least all of its stated objectives.

We claim:
1. In combination,
a tractor,
a front loader mounted on said tractor,
said loader including a loader frame means having a pair of upstanding towers, a pair of boom arms pivotally mounted to the upper end of said towers and extending forwardly of said tractor, and a pair of first hydraulic cylinder means connected between said boom arms and the lower ends of said towers for raising and lowering said boom arms,
a normally generally upright extender frame means operatively pivotally mounted, about a horizontal axis, on the forward ends of said boom arms,
second hydraulic cylinder means extending between said boom arms and said extender frame means for pivotally moving said extender frame means relative to said boom arms,
a slide means vertically movably mounted on said extender frame means,
a materials handling attachment operatively secured to said slide means,
and a pair of flexible cable means connected at one end to the lower ends of said towers, said pair of cable means passing around pulley means connected to said boom arms adjacent the connection of said first hydraulic cylinder means, and connected at the other ends to said slide means, for vertically moving said slide means relative to said extender frame means upon operation of said first hydraulic cylinder means so that said materials handling attachment will be raised or extended above the position normally permitted by said boom arms.

2. The combination of claim 1 wherein a quick-attach means is mounted on the forward ends of said boom arms, said extender frame means being selectively removably secured to said quick attach means.

3. The combination of claim 1 wherein said materials handling attachment comprises a hay bale spike means.

4. In combination,
a wheeled vehicle,
a front loader mounted on said wheeled vehicle,
said loader including a loader frame means having a pair of upstanding towers, a pair of boom arms pivotally mounted to the upper end of said towers and extending forwardly of said wheeled vehicle, and a pair of first hydraulic cylinder means connected between said boom arms and the lower ends of said towers for raising and lowering said boom arms,
a normally generally upright extender frame means operatively pivotally mounted, about a horizontal axis, on the forward ends of said boom arms,
second hydraulic cylinder means extending between said boom arms and said extender frame means for pivotally moving said extender frame means relative to said boom arms,
a slide means vertically movably mounted on said extender frame means,
a materials handling attachment operatively secured to said slide means,
and a pair of flexible cable means connected at one end to the lower ends of said towers, said pair of cable means passing around pulley means connected to said boom arms adjacent the connection of said first hydraulic cylinder means, and connected at the other ends to said slide means, for vertically moving said slide means relative to said extender frame means upon operation of said first hydraulic cylinder means so that said materials handling attachment will be raised or extended above the position normally permitted by said boom arms.

5. For use on a tractor having hydraulic power means, in combination:

a front loader, means removably mounting said front loader on the forward end of a tractor;

said loader including a loader frame means having a pair of upstanding towers, a pair of boom arms pivotally mounted to the upper end of said towers and extending forwardly of said tractor, a pair of first hydraulic cylinder means connected between said boom arms and the lower ends of said towers for raising and lowering said boom arms, a normally generally upright extender frame means operatively pivotally mounted, about a horizontal axis, on the forward ends of said boom arms, second hydraulic cylinder means extending between said boom arms and said extender frame means for pivotally moving said extender frame means about their pivotal mounts on said boom arms, a slide means vertically movably mounted on said extender frame means, a materials handling attachment operatively secured to said slide means, and a pair of flexible cable means connected at one end to the lower ends of said towers, said pair of cable means passing around pulley means connected to said boom arms adjacent of the connection of said first hydraulic cylinder means, and connected at their other ends to said slide means, for vertically moving said slide means relative to said extender frame means so that said materials handling attachment will be raised or extended above the position normally permitted by said boom arms.

* * * * *